(No Model.)
C. W. HUNT.
CONVEYER.
No. 466,041.  Patented Dec. 29, 1891.
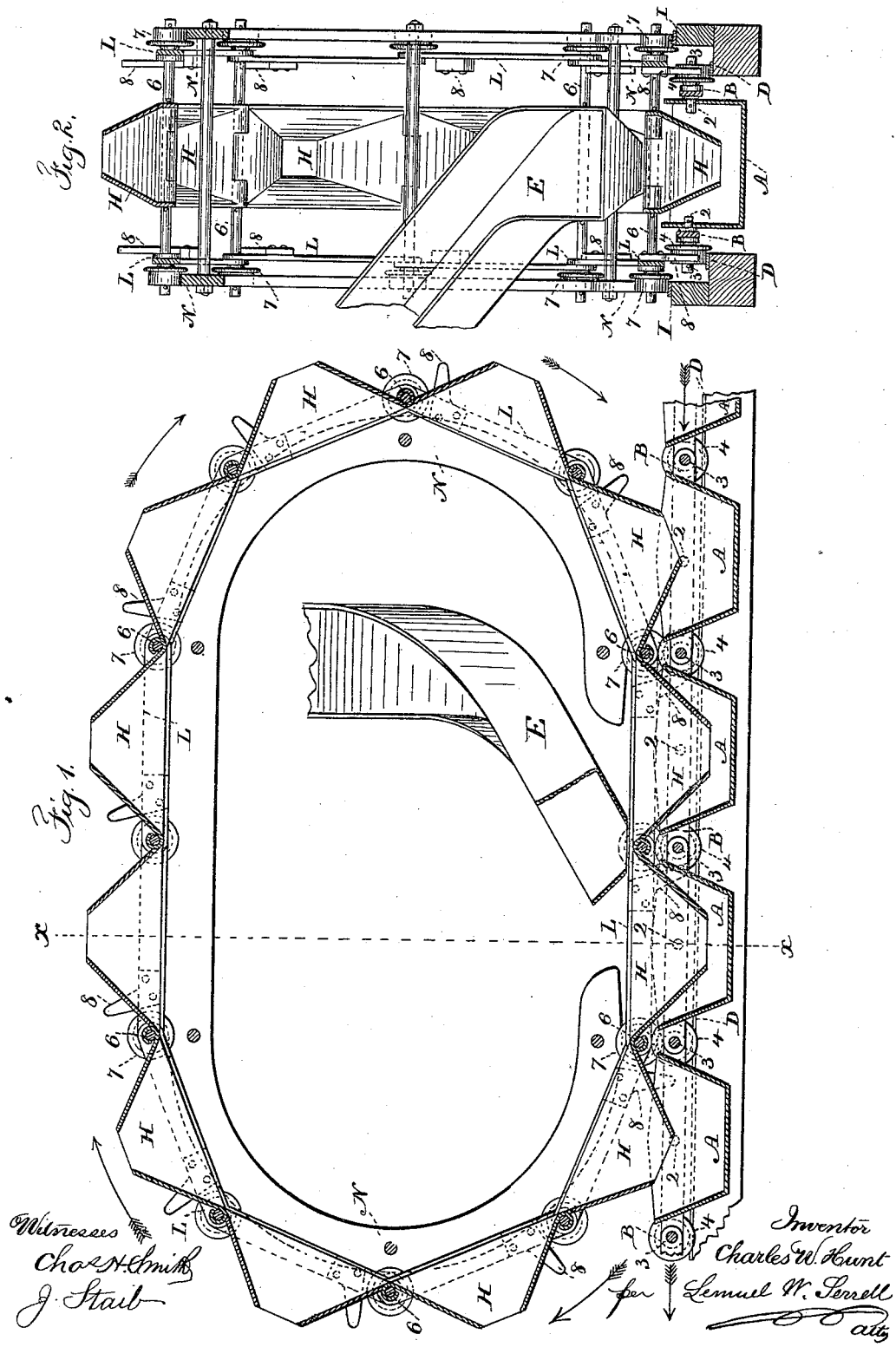

UNITED STATES PATENT OFFICE.

CHARLES W. HUNT, OF WEST NEW BRIGHTON, NEW YORK.

CONVEYER.

SPECIFICATION forming part of Letters Patent No. 466,041, dated December 29, 1891.

Application filed June 5, 1891. Serial No. 395,198. (No model.)

*To all whom it may concern:*

Be it known that I, CHARLES W. HUNT, of West New Brighton, in the county of Richmond and State of New York, have invented an Improvement in Conveyers, of which the following is a specification.

Buckets for the reception of coal and other substances have been connected together by chains and supported by wheels upon tracks, so that such buckets have been filled with the materials and drawn to the distant place for dumping or discharge. The material has been supplied by a chute, and in consequence of the space between one bucket and the next the coal or other material has in some instances fallen through between these buckets. In my patent, No. 442,976, dated December 16, 1890, there is represented a range of covering-plates mounted upon endless chains, which moving along with the chain of buckets cover the openings between one bucket and the next.

My present invention relates to the combination, with conveyer-buckets and their connecting-chains, of a series of hoppers hinged together and moving along with the range of buckets, so as to receive the coal or other material from the chute or spout and deliver the same to the buckets without the material being spilled.

In the drawings, Figure 1 is a vertical longitudinal section of the devices used by me, and Fig. 2 is a cross-section at the line $x\ x$, Fig. 1.

The conveyer is to be of any desired character and provided with a range of buckets or other receptacles. I have shown the buckets A as connected to the conveyer-chains B by pivots 2, and the links are connected by cross-shafts 3 with rollers or wheels 4 upon the track-rails D.

The chute or spout E is adapted to the supply of coal or other material to the buckets A as such buckets A are drawn along progressively below the lower end of such chute; but there is sufficient space between the lower end of the chute and the buckets for the introduction of the hoppers, next described.

The hoppers H may be made of metal, and they are wider at their upper ends than the lower end of the chute E, and they are preferably pyramidal, the lower open ends being smaller than the measurement of the buckets, so that such hoppers may pass down into the respective buckets more or less as they move along, and the length of such hoppers at their top edges corresponds to the length between the cross-shafts of the chain of buckets, so that said ends of the hoppers can be cut and bent as hinges, and the cross-bars 6 will form the hinge-pins that connect one hopper to the next in the range of hoppers, and these cross-bars 6 are preferably provided with rollers 7 on their ends that run upon the stationary tracks I, and there may be projecting arms 8 on the hoppers or their chains L, passing down in front of the rollers 4 of the conveyer, in order that the hoppers and the buckets may move along together as the buckets are propelled by any suitable power. The hoppers are connected into an endless chain sufficiently long to pass up and around the lower end of the supply-chute, and to support this chain of hoppers there may be skeleton wheels or drums, as in my aforesaid patent, No. 442,976; but I prefer and have shown the straight tracks I and the curved tracks N, so that the wheels 7 may run upon these tracks as the endless chain of hoppers moves along with the conveyer as it passes along under the lower end of the supply-chute.

It is to be borne in mind that the depth of the hoppers is to be such that the material in them will not overflow the buckets as such hoppers rise from the buckets and allow the coal or other material to run through the hoppers into the buckets; and with this object in view the hoppers should set down into the buckets sufficiently for the contents of the hoppers and the material that runs through the same and banks in the bottom of the bucket to properly fill such bucket as the hoppers rise from the same.

I claim as my invention—

1. The combination, with a chain conveyer, of a separate range of hoppers hinged together to form an endless chain, and a supply-chute beneath which the range of hoppers passes, substantially as specified.

2. The combination, with a chain conveyer containing buckets, of a separate range of hoppers connected together to form an endless range, supporting-wheels connected with the hoppers, tracks therefor, and a supply-chute, substantially as specified.

3. The combination, with the chain conveyer, of a separate endless series of hoppers adapted to move with the buckets of the conveyer and to direct the material into the same, substantially as set forth.

Signed by me this 2d day of June, 1891.

CHAS. W. HUNT.

Witnesses:
GEO. T. PINCKNEY,
WILLIAM G. MOTT.